United States Patent
Degady

(10) Patent No.: US 10,258,060 B2
(45) Date of Patent: Apr. 16, 2019

(54) METHODS AND SYSTEMS FOR PRODUCTION OF LOW WATER ACTIVITY FILLINGS

(71) Applicant: Intercontinental Great Brands LLC, East Hanover, NJ (US)

(72) Inventor: Marc Degady, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 252 days.

(21) Appl. No.: 15/116,160

(22) PCT Filed: Feb. 6, 2015

(86) PCT No.: PCT/US2015/014736
§ 371 (c)(1),
(2) Date: Aug. 2, 2016

(87) PCT Pub. No.: WO2015/120219
PCT Pub. Date: Aug. 13, 2015

(65) Prior Publication Data
US 2017/0164635 A1   Jun. 15, 2017

Related U.S. Application Data

(60) Provisional application No. 61/937,416, filed on Feb. 7, 2014.

(51) Int. Cl.
*A23G 3/34* (2006.01)
*A21D 13/38* (2017.01)
*A21D 13/32* (2017.01)
*A23G 3/40* (2006.01)

(52) U.S. Cl.
CPC ............ *A23G 3/346* (2013.01); *A21D 13/32* (2017.01); *A21D 13/38* (2017.01); *A23G 3/40* (2013.01)

(58) Field of Classification Search
CPC . A23G 3/346; A23G 3/40; A23B 7/14; A21D 13/38; A21D 13/32

USPC ........................................................ 426/572
See application file for complete search history.

(56) References Cited

U.S. PATENT DOCUMENTS

| 5,939,127 A | 8/1999 | Abboud |
| 6,528,104 B1 | 3/2003 | Jindra et al. |
| 2003/0091707 A1 | 5/2003 | Jindra |

FOREIGN PATENT DOCUMENTS

| FR | 2905564 A1 | 3/2008 |
| JP | S60202199 | 10/1985 |
| JP | 63133942 | 6/1988 |
| JP | 03292858 | 12/1991 |

OTHER PUBLICATIONS

Notice of Reasons for Rejection, dated May 1, 2017 for Japanese Patent Application No. 2016-545999, with English translation (6 pgs.).
International Search Report, dated May 8, 2015 for International Application No. PCT/US2015/014736 (3 pgs.).
Written Opinion of the International Searching Authority for International Application No. PCT/US2015/014736 (6 pgs.).
English translation of Notification of Reasons for Refusal, dated Dec. 13, 2017, for Japanese Application No. 20165459993 (5 pgs.).
Canadian Patent Office, Office Action dated Jun. 27, 2017 from Canadian Application No. 2,936,426 (3 pgs.).
European Patent Office, Examination Report dated Dec. 11, 2017 from European Application No. 15704921.4 (6 pgs.).

*Primary Examiner* — Jyoti Chawla
(74) *Attorney, Agent, or Firm* — Fitch, Even, Tabin & Flannery LLP

(57) ABSTRACT

A method and system for making a low-water activity filling, such as crème type fillings, is provided. The fillings advantageously can be used with rotary sandwiching machines without the need for a cooling tunnel downstream of the scraped-surface heat exchanger in the production line. The fillings produced herein comprise a fat component and sugar source, and the fat in the filling has the desired crystalinity. The process and system described herein unexpectedly achieve both a desired nucleation and crystallization rate and crystal structure, as well as the resulting increased filling firmness, in the fillings produced therewith.

17 Claims, 8 Drawing Sheets

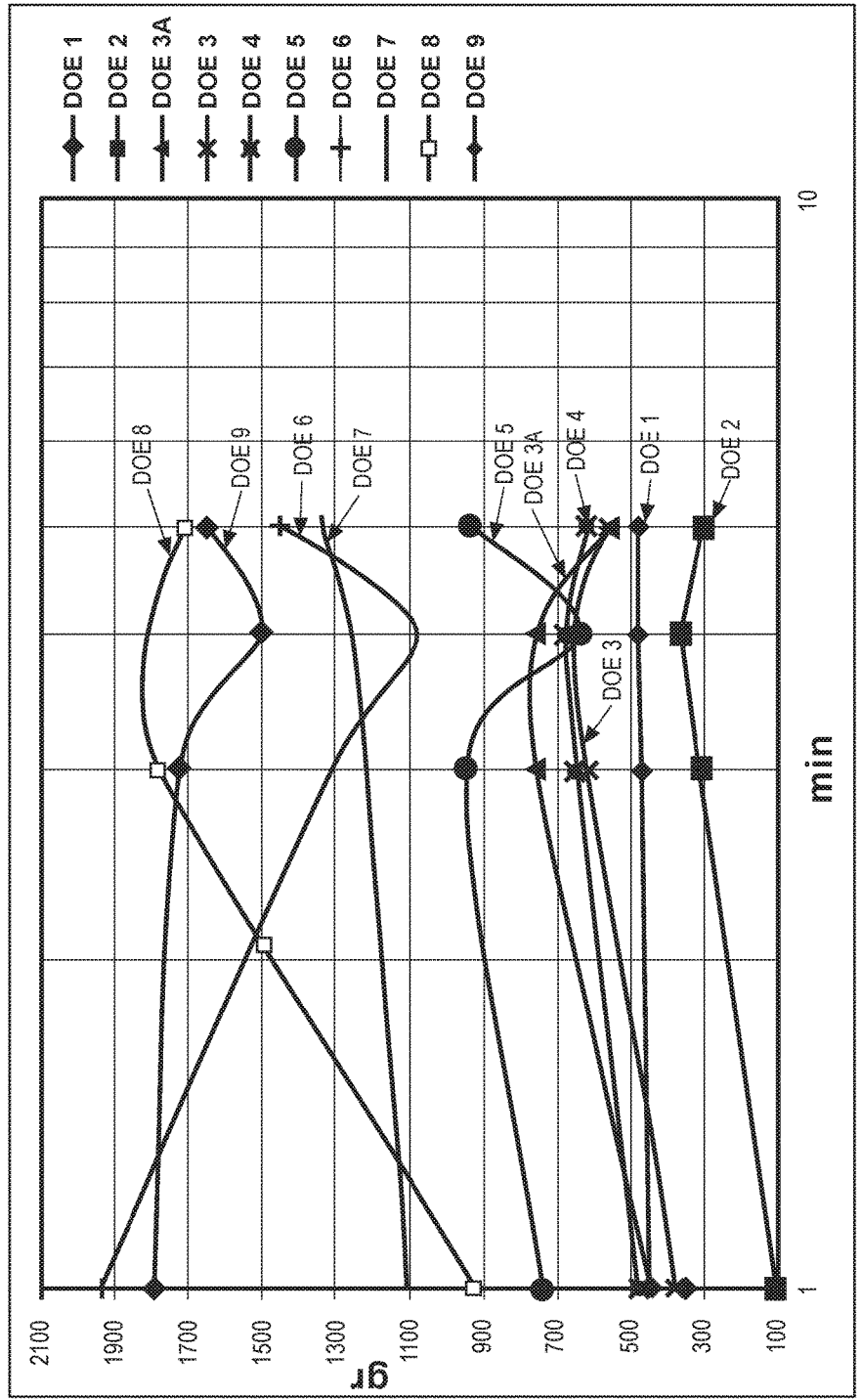
FIG. 3A CONE PENETRATION EVOLUTION AFTER SAMPLING

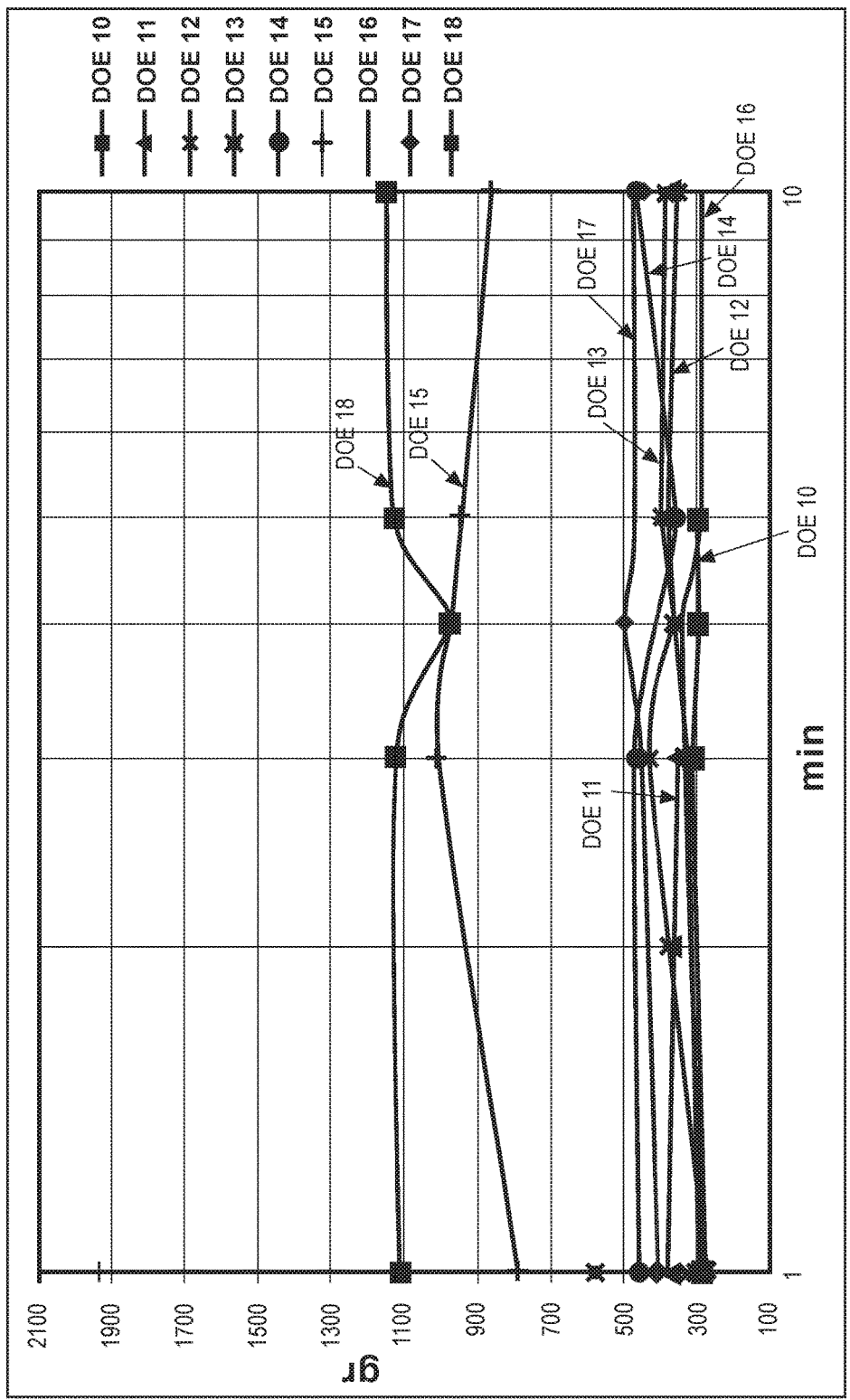

METHODS AND SYSTEMS FOR PRODUCTION OF LOW WATER ACTIVITY FILLINGS

CROSS REFERENCE TO RELATED APPLICATIONS

This application is a U.S. national phase application of International Application No. PCT/US2015/014736, filed Feb. 6, 2015, which claims benefit from U.S. Application 61/937,416, filed Feb. 7, 2014, which are hereby incorporated herein by reference in their entirety.

FIELD

The present application generally relates to manufacturing of low water activity fillings, and more particularly to a process and system for producing low water activity fillings comprising a fat component and sugar.

BACKGROUND

Low water activity and smooth-textured fillings, such as crème-type fillings, for sandwich cookies (e.g., OREO® cookies) generally are produced using large-scale manufacturing equipment on production lines. Typically near the end of the manufacturing line, a slurry containing oil and sugar goes through a scraped-surface heat exchanger before being dispensed onto cookie base cakes and passed through a cooling tunnel to increase the firmness of the filling.

Fillings coming directly out of the scraped-surface heat exchanger are often too soft for use in a rotary sandwiching machine. The art has proposed a number of solutions to this challenge. However, the proposed solutions generally result in slowing production and/or increasing production costs.

For instance, additional sugar can be added to increase the crystallinity and thereby providing a firmer texture to the filling before it is dispensed onto cookie base cakes. Such addition of sugar generally is undesirable as doing so may increase production time as well as increasing costs for ingredients.

Another attempt to resolve this problem is to pass the fillings through a cooling tunnel for several minutes (e.g., 4-5 minutes) at 35 to 40° F. after dispensing the fillings onto cookie base cakes. The cooling tunnel increases the rate of crystallization, thereby providing a firmer texture to the filling. The cooled and firmer filling is better suited for handling and/or processing (e.g., by a rotary sandwiching machine). However, inclusion of cooling tunnels in the production line adds increased production time, energy usage, and overall manufacturing costs.

Accordingly, it would be desirable to be able to eliminate the use of the cooling tunnel from the manufacturing line and to avoid the need to add additional sugar during a production run to adjust the firmness of a filling.

SUMMARY

A method is provided for making a low water activity filling. The fillings described herein are suitable for use with rotary sandwiching machines in the production of sandwich cookies. The methods described herein are particularly suitable for fillings comprising a large percentage of sugar and fat component.

In one approach, the method includes providing a fat component; heating the fat component to a temperature above a melting point of the fat component; adding a sugar source to the fat component and continuously mixing the fat component and the sugar source while maintaining the temperature above the melting point of the fat component to form a slurry; introducing the slurry at a temperature above the melting point of the fat component into a scraped-surface heat exchanger; cooling the slurry in the scraped surface heat exchanger at a cooling rate of about 7° F./minute to about 72° F./minute; and dispensing the slurry from the heat exchanger at a temperature effective to provide the filling. In other aspects, the fat component and sugar source may be combined prior to heating the fat component to a temperature above its melting point.

In one form, the method includes heating the fat component to a temperature at least 10° F. above the melting point of the fat component. In another form, the method includes heating the fat component to a temperature at least 20° F. above the melting point of the fat component.

In one aspect, the fat component is selected from canola oil, palm oil, high oleic canola oil, soybean oil, safflower oil, sunflower oil, palm kernel oil, shea butter, mango kernel oil, illipe oil, sal oil, cocoa butter, equivalents of cocoa butter, or combinations thereof. In one aspect, the sugar source comprises powdered sugar having a maximum of about 5 percent particles greater than about 150 microns and a maximum of about 20 percent particles greater than 75 microns. At least in some approaches, the powdered sugar may include particles sized such that the powdered sugar has a $D_{90}$ of from about 40 to about 180 microns in one aspect, and a $D_{90}$ of from about 40 microns to about 80 microns in another aspect. In another aspect, the powdered sugar may include particles sized such that the powdered sugar has a $D_{10}$ of from about 3 to about 8 microns in one aspect, and a $D_{50}$ of from about 10 microns to about 40 microns in another aspect, or a $D_{50}$ of from about 10 microns to about 20 microns in yet another aspect.

In one approach, the method includes moving the slurry through the scraped-surface heat exchanger at a through-put rate of between 500 kg/hr to about 1000 kg/hr. In one aspect, the method includes moving the slurry through the scraped-surface heat exchanger at a through-put rate of between 500 kg/hr to about 750 kg/hr. At least in some approaches the method includes rotating a rotor of the scraped-surface heat exchanger at a speed of about 80 rotations per minute to about 120 rotations per minute.

The slurry may pass through an annular space of the scraped-surface heat exchanger located between an outside diameter of a rotor of the scraped-surface heat exchanger and an interior diameter of a cooling transfer tube of the scraped surface heat exchanger. In one aspect, the method may include rotating the rotor of the scraped-surface heat with a ratio of the interior diameter of the cooling transfer tube of the scraped-surface heat exchanger to the annular space of the scraped-surface heat exchanger being about 6 to 1.

The cooling of the slurry in the scraped-surface heat exchanger may include moving the slurry through the scraped-surface heat exchanger such that the residence time of the slurry in the heat exchanger is from about 1 to about 14 minutes. In one aspect, cooling the slurry in the scraped-surface heat exchanger includes moving the slurry through the scraped-surface heat exchanger such that the residence time of the slurry in the heat exchanger is from about 2 to about 6 minutes.

In one aspect, the dispensing of the resulting filling from the heat exchanger at a temperature effective to provide the filling further includes dispensing the filling from the heat exchanger at a temperature of about 60° F. to about 90° F.

In another aspect, the dispensing the slurry from the heat exchanger at a temperature effective to provide the filling further includes dispensing the slurry from the heat exchanger at a temperature of about 60° F. to about 80° F. In yet another aspect, the dispensing the slurry from the heat exchanger at a temperature effective to provide the filling further includes dispensing the slurry from the heat exchanger at a temperature of about 63° F. to about 67° F.

In one aspect, the dispensing of the slurry from the heat exchanger at a temperature to provide the filling further includes dispensing the slurry from the heat exchanger at a temperature about 35° to about 50° F. below the melting point of the fat component.

The processes described herein advantageously provide both a desired nucleation and crystallization rate during production of the filling. Finished products including the fillings described herein advantageously can be produced without a cooling tunnel downstream of a cookie sandwiching apparatus.

BRIEF DESCRIPTION OF THE DRAWINGS

FIG. 3 shows exemplary cone penetrometry data obtained during trial runs of a crème filling manufacturing process of FIG. 1 at varying conditions;

DETAILED DESCRIPTION

Figure 1:
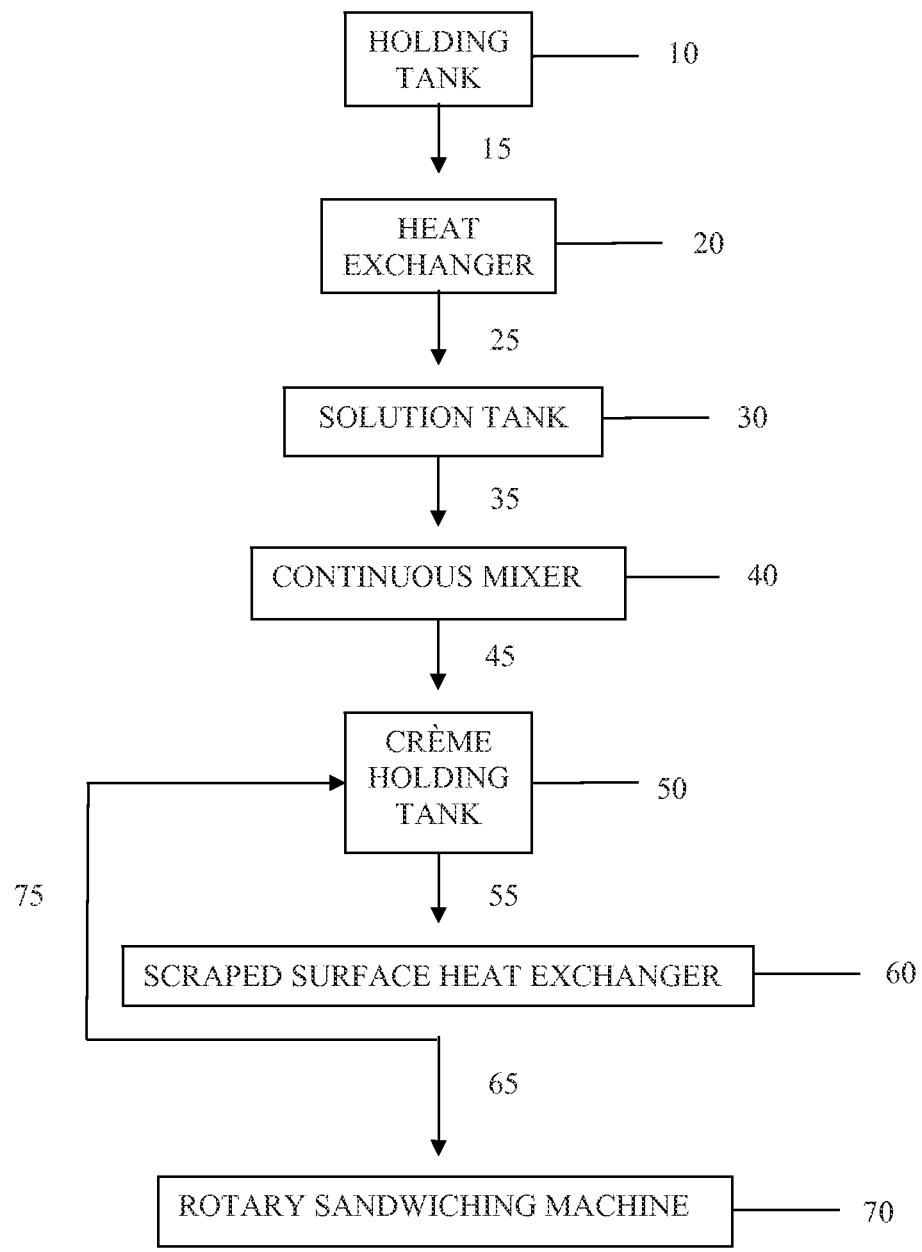
FIG. 1 is a process flow diagram illustrating production of an exemplary crème filling according to one exemplary embodiment as described herein.

The present application is generally directed to the manufacture of low water activity fillings suitable for use with rotary sandwiching machines in the production of sandwich cookies. The methods described herein are particularly suitable for fillings comprising a large percentage of sugar and fat component. As discussed above, prior processing of fillings comprising a fat component and sugar often required the use of a cooling tunnel to increase the rate of fat crystallization in order to provide a firmer texture to the filling after being discharged from a scraped-surface heat exchanger. The process described herein unexpectedly achieves a desired fat crystal structure, and nucleation and crystallization rates, as well as a resulting increased firmness in the filling, which permits use in rotary sandwiching machines without the need for a cooling tunnel downstream of a scraped-surface heat exchanger in a production line.

In one aspect, the methods described herein are particularly useful for fillings comprising about 20 to about 50 percent fat component, in another aspect about 25 to about 45 percent fat component, in another aspect about 25 to about 40 percent fat component, and in yet another aspect about 30 to about 40 percent fat component. In another aspect, the fillings produced by the methods described herein comprise about 50 to about 80 percent sugar, in another aspect about 55 to about 75 percent sugar, in another aspect about 60 to about 75 percent sugar, and in yet another aspect about 60 to about 70 percent sugar.

Exemplary fat components that may be used in the methods described herein include, for example, canola oil, palm oil, high oleic canola oil, soybean, safflower, sunflower, palm kernel oil, shea butter, mango kernel, illipe oil, sal oil, cocoa butter or fractions or equivalents of cocoa butter, or combinations thereof. In one aspect, a fat component that may be used in the methods described herein comprises about 40 to about 80 percent liquid oil and about 20 about 60 percent solid fat at room temperature (e.g., 70° F.).

Exemplary sugar sources that may be used in the methods described herein include, for example, sucrose, glucose, fructose, and dextrose. In one aspect, the sugar source is in the form of powdered sugar. In one exemplary approach, the powdered sugar may comprise a maximum of about 5 percent particles with a size of greater than about 150 microns and a maximum of about 20 percent particles with a size of greater than 75 microns. At least in some approaches, the powdered sugar may include particles sized such that the powdered sugar has a $D_{90}$ of from about 40 to about 180 microns in one aspect, and a $D_{90}$ of from about 40 microns to about 80 microns in another aspect. In another aspect, the powdered sugar may include particles sized such that the powdered sugar has a $D_{10}$ of from about 3 to about 8 microns in one aspect and a $D_{50}$ of from about 10 microns to about 40 microns in another aspect, or a $D_{50}$ of from about 10 microns to 20 microns in another aspect. Without wishing to be limited by theory, particle sizes of the sugar as described above provide for a filling having a smooth mouthfeel that is pleasing to consumers. Notably, if the particle size of the sugar is too fine, then too much fat may be needed to ensure good machining during the manufacture of the crème and to ensure desirable organoleptic properties of the filling. On the other hand, if the sugar is too coarse, then the filling material may be too gritty, which is undesirable during both manufacture and consumption.

Additional ingredients may also be included, if desired. For example, coloring ingredients, emulsifiers (e.g., soy lecithin), and flavors (e.g., cocoa or other flavoring ingredients) can also be added.

Generally, the fillings obtainable by the exemplary processes described herein have low water activity, such as less than about 0.4 in one aspect, less than about 0.3 in another aspect, and less than about 0.25 in another aspect. In some approaches, the fillings may include little or no water added as a separate ingredient (e.g., generally less than 4% percent added water in one aspect, less than 2% added water in another aspect, and no added water in another aspect.

It was unexpectedly discovered, at least in some approaches, that controlling one or more processing conditions, including temperature of the fat component upstream of the scraped-surface heat exchanger, temperature (more specifically, the cooling rate) of the mixture of fat component and sugar in the scraped-surface heat exchanger, shear rate, and outlet temperature of the filling from the scraped-surface heat exchanger as described further herein facilitates the formation of a filling having the desired fat crystallinity and firmness without requiring the use of a cooling tunnel or further addition of sugar.

FIG. 1 is a flow chart diagram of an exemplary process for manufacturing a filling. In one aspect, a holding tank 10 stores a fat component. The fat component may be in liquid form and provided to the holding tank 10 from an oil bulk tank. While the fat component is stored in the holding tank 10, optional minor ingredients may be added to the fat component. Such minor ingredients may include, for example, flavoring (e.g., vanillin, cocoa), coloring, an emulsifier such as lecithin (e.g., soy lecithin), or the like. It will be appreciated that the above-indicated optional minor ingredients and/or other minor ingredients may alternatively or additionally be added to the fat component in the solution tank 30 or in the continuous mixer 40, which are described in more detail below.

In the approach illustrated in FIG. 1, the fat component flows from the holding tank 10 via a conduit 15 (e.g., pipe or a tube) through a heat exchanger 20 such that the temperature of the fat component is maintained at or above, or raised to a temperature that is preferably above, the melting point of the fat component. As used herein, the phrases "above the melting point," "in excess of the melting point," or variations thereof mean that the fat component is maintained, or raised to a temperature of, at least about 10° F. above the melting point, in another aspect at least about 15° F. above the melting point, in another aspect at least about 20° F., and in another aspect at least about 25° F. above the melting point of the fat component. As fats may include a mixture of fatty acids (e.g., saturated fatty acids, unsaturated fatty acids, or fatty acids having differing chain lengths) and may include one or more types of crystals (e.g., alpha, beta prime, and beta crystals) each having its own melting point, the term "melting point" as used herein means the highest melting point of any constituent within the fat component. By maintaining or heating the fat component to a temperature in excess of the melting point as described herein, the fat crystals in the fat component are melted and the crystal memory is erased. It will be appreciated that the heat exchanger 20 is an optional feature and that the oil or fat-containing material may be heated via a means alternative to the heat exchanger 20.

For example, when the fat component includes fractionated palm oil and has a melting point of about 115° F., the fat component is maintained at or raised to a temperature of at least about 140° F., in another aspect to at least about 130° F., in another aspect to a temperature of between about 120° F. and about 130° F., and in yet another aspect between about 125° F. to about 130° F.

In one aspect illustrated in FIG. 1, the fat component moves through the heat exchanger 20 and flows via a conduit 25 into a solution tank 30. While the solution tank 30 stores the fat component in the illustrated method, it will be appreciated that the solution tank 30 may be eliminated such that, as the fat component is heated when it passes through the heat exchanger 20, the heated fat component flows directly into a continuous mixer 40, which is described in more detail below. When the solution tank 30 is used, optional minor ingredients (e.g., vanillin, coloring, cocoa, lecithin, or the like) may be added to the heated fat component. In one aspect and as discussed above, while the heated fat component is stored in the solution tank 30, the temperature of the heated fat component is maintained above the melting point of the fat component.

Referring again to FIG. 1, the fat component (while being maintained at a temperature above its melting point) flows through a conduit 35 into a continuous mixer 40. In one aspect, the continuous mixer 40 is a Codos® continuous mixer but other conventional mixing equipment, including other continuous mixers, may be used.

In the illustrated approach, a sugar source is added to the heated fat component in the continuous mixer 40, and the sugar source and the fat component are mixed in the continuous mixer 40 to form a slurry. Optional minor ingredients (e.g., vanillin, coloring, cocoa, lecithin, or the like) may be added to the continuous mixer 40, if desired. In one aspect, while the heated fat component is mixed with the sugar source in the continuous mixer 40, the temperature of the slurry is maintained above the melting point of the fat component. In one approach, the slurry is maintained at or raised to a temperature of at least about 10° F. above the melting point of the fat component, in another aspect at least about 15° F. above the melting point of the fat component, in another aspect at least about 20° F., and in yet another aspect at least about 25° F. above the melting point of the fat component.

Maintaining and/or heating the fat component (as well as the slurry containing the fat component and sugar source) in excess of the melting point of the fat component advantageously provides for better flowability of the slurry, and advantageously reduces and/or prevents clogging of the conduits and/or other components through which the slurry flows. Without wishing to be limited by theory, the melting of the fat crystals in the fat component not only advantageously erases the crystal memory of the fat but also reduces the viscosity of the fat component and the slurry and permits the fat component and the slurry to be more flowable through the conduits and/or other components of the system. Conversely, if the fat component is not heated to a temperature in excess of its melting point as described above, the addition of the sugar source (which may be, for example, at room temperature or colder temperature) may cause the slurry to clog up the system.

In another aspect and as shown in FIG. 1, the slurry, while still being maintained at a temperature above the melting point of the fat, flows via a conduit 45 from the continuous mixer 40 to a filling or crème holding tank 50. In one aspect, while the slurry is stored in the filling or crème holding tank 50, the temperature of the filling is maintained or heated to a temperature above the melting point of the fat component as described above.

In the approach illustrated in FIG. 1, the slurry flows from the crème holding tank 50 via a conduit 55 to a scraped-surface heat exchanger 60. In one aspect, the slurry enters the scraped-surface heat exchanger 60 at a temperature in excess of the melting point of the fat component, for example, at a temperature of at least 130° F. in one aspect, or at a temperature of at least 140° F. in another aspect. An exemplary scraped-surface heat exchanger suitable for use with the present method/system is a Votator® scraped surface heat exchanger, manufactured by Waukesha Cherry-Burrell, although other scraped surface heat exchangers may be used.

Figure 2:
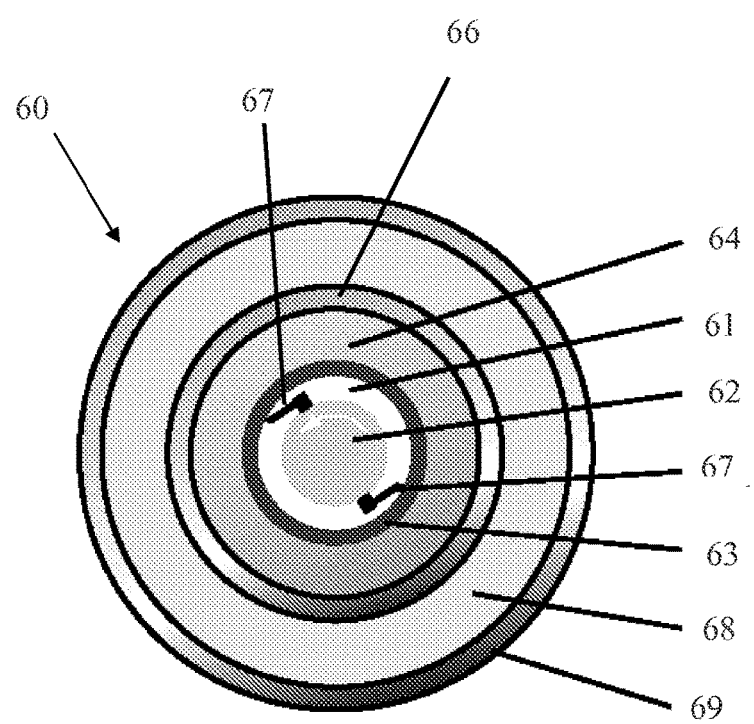
FIG. 2 is an end view in cross-section of an exemplary scraped-surface heat exchanger suitable for use with the process shown in FIG. 1.

In one approach, immediately before the slurry enters the scraped-surface heat exchanger 60, air is introduced into the slurry. Without wishing to be limited by theory, this aeration of the slurry may be used to adjust filling density as well as filling firmness. In one approach, the specific gravity of the slurry without aeration is 1.4 to 1.6 but is reduced by way of aeration to about 1.0 to about 1.1, in another aspect about 1.0 to about 1.08, and in another aspect about 1.0 to about 1.05. With reference to FIG. 2, generally a slurry that enters the scraped-surface heat exchanger 60 is pumped into a center chamber 61 of the scraped-surface heat exchanger 60. The center chamber 61 is located between an outer surface of a shaft 62 and an interior surface of a cold/heat transfer tube 63. For purposes of this application, the distance between the outer surface of shaft 62 and the interior surface of the cold/heat transfer tube 63 is also referred to as an "annular space." Countercurrent to the flow of the aerated slurry in center chamber 61 may be a chamber 64 including a cold glycol solution, which surrounds the heat transfer tube 63 and is in turn surrounded by an outer tube 66. While cold glycol solution is a preferred cooling medium in the chamber 64, any other suitable cooling medium (and, optionally, heating medium) may be used. In one aspect, a layer of insulation 68 is located outside the tube 66 that contains the glycol solution. Without wishing to be limited by theory, the layer of insulation 68 restricts the transfer of heat from the atmosphere to the glycol solution. A cover 69, which is preferably made of stainless steel, covers the layer of insulation 68 as shown in FIG. 2.

In the form illustrated in FIG. 2, scraper blades 67 are coupled to the shaft 62 and are movably positioned in the center chamber 61. Without wishing to be limited by theory, the scraper blades 67 facilitate the heat transfer of the slurry by increasing the surface area of the slurry exposed to the cold transfer tube 63. For example, the scraper blades 67 apply a thin film of slurry onto the interior surface of the tube 63 for a predefined period of time, which is called "dwell time" for purposes of this application. The application of the thin film of slurry onto the interior surface of the tube 63 for a predetermined dwell time is believed to contribute to controlled nucleation and crystallization of the crème filling.

As discussed above, the slurry enters the scraped-surface heat exchanger 60, preferably at a temperature in excess of the melting point of the fat component. As the slurry moves through the annular space of the scraped surface heat exchanger 60, the temperature of the slurry is dropped at predetermined rate until the slurry is discharged from the scraped-surface heat exchanger 60 at an outlet 65, schematically illustrated in FIG. 1.

By one approach, the slurry enters the scraped-surface heat exchanger 60 at a temperature of at least about 10° F. above the melting point, in another aspect at least about 15° F. above the melting point, in another aspect at least about 20° F., and in another aspect at least about 25° F. above the melting point of the fat component and, in one aspect, is cooled at a rate of about 4° C./minute to about 40° C./minute, in another aspect at a rate of about 4° C./minute to about 30° C./minute, in another aspect about 4° C./minute to about 20° C./minute, in another aspect about 4° C./minute to about 10° C./minute, and in yet another aspect about 4° C./minute to about 8° C./minute before exiting the scraped-surface heat exchanger 60 at a temperature of between about 60° F. to about 90° F. in one aspect, in another aspect at a temperature of about 60° F. to about 80° F., in another aspect about 60° F. to about 70° F., and in another aspect at a temperature of about 63° F. to about 67° F. At least in some approaches, the outlet temperature of the filling from the scraped-surface heat exchanger is advantageously about 35 to about 50° F. lower than the melting point of the fat component.

In one aspect, the selected cooling rate of the slurry in the scraped-surface heat exchanger 60 advantageously contributes to controlling the nucleation and crystallization rate of the fat in the crème filling, in combination with one or more other factors described herein, such as the temperature of the slurry when it enters the scraped-surface heat exchanger 60, the rate of movement of the slurry through the scraped-surface heat exchanger 60, the shear rate of the slurry in the scraped-surface heat exchanger 60, and the outlet temperature of the slurry when it exits the scraped-surface heat exchanger 60.

Exemplary cooling rates of the slurry as the slurry moves through the scraped-surface heat exchanger 60 are shown below in Table 1. In one approach, the slurry is moved through the scraped-surface heat exchanger 60 at a rate of approximately 1000 kg/hr and the holding capacity of the scraped-surface heat exchanger 60 is approximately 22 liters. It may be appreciated that the scraped-surface heat exchanger 60 may have any other suitable holding capacity that is less than about 22 liters or greater than about 22 liters. It will also be appreciated that the rate of movement of the slurry through the scraped-surface heat exchanger 60 may be less than about 1000 kg/hr (e.g., about 750 kg/hr or about 500 kg/hr), or may be greater than about 1000 kg/hr. Exemplary residence times of the slurry in the scraped-surface heat exchanger 60 are also shown below in Table 1. As can be seen in Table 1, the cooling rate of the slurry in the scraped-surface heat exchanger 60 may vary from approximately 4° C./min (39° F./min) to approximately 40° C./min (104° F./min) and advantageously is believed to affect the nucleation and crystallization rate of the filling. Similarly, the residence time of the slurry in the scraped-surface heat exchanger 60 may vary from approximately 1 minutes to approximately 20 minutes in one aspect and from approximately 2 minutes to approximately 14 minutes in another aspect. In one aspect the residence time for production of an exemplary filling is about 6 minutes.

TABLE 1

Flow Rate, Cool Rate, and Residence Time of the Slurry

| Run | Flow (kg/hr) | Cool Rate (° C./min) | Residence Time (min) |
| --- | --- | --- | --- |
| 0 | 100 | 4.008 | 13.86 |
| 1 | 200 | 8.017 | 6.93 |
| 2 | 300 | 12.025 | 4.62 |
| 3 | 400 | 16.033 | 3.465 |
| 4 | 500 | 20.042 | 2.772 |
| 5 | 600 | 24.05 | 2.31 |
| 6 | 700 | 28.058 | 1.98 |
| 7 | 800 | 32.067 | 1.733 |
| 8 | 900 | 36.075 | 1.54 |
| 9 | 1000 | 40.083 | 1.386 |

In one aspect, the scraped-surface heat exchanger 60 may be a Votator® 6×72-II-XHD having the following specs: cylinder length about 72 inches; diameter of the cold/heat transfer tube 63 is about 6 inches, while the diameter of the shaft 62 is about 4 inches (which provides a variable annular space 61). In one exemplary form, the volume of the scraped-surface heat exchanger 60 may be about 22 liters, the pressure rating may be approximately 56 bar or 800 psi, the motor size may be between about 20 to about 30 Hp; the spline may be about 2 inches or about 50 mm and may be made of stainless steel, and the heat transfer surface area may be about 9 ft$^2$.

Without wishing to be limited by theory, agitation of the slurry in the scraped-surface heat exchanger 60 also contributes to providing a filling having the desired nucleation and crystallization rates of the filling. For example, utilizing high shear in the scraped-surface heat exchanger 60 generally results in a filling having lower viscosity. In one aspect, the rotor speed of the scraped-surface heat exchanger 60 is kept constant. In one approach, the rotor speed of the scraped-surface heat exchanger may be from about 80 to about 120 rotations per minute. In another aspect, the shear rate may be proportional to a ratio of the interior diameter of the heating/cooling transfer tube 63 and the annular space. In one approach, a preferred shear rate is obtained with a ratio of the interior diameter of the heating/cooling transfer tube 63 and the annular space 61 being about 2:1 to about 15:1, in another aspect about 2:1 to about 10:1, in another aspect about 3:1 to about 8:1, and in another aspect about 6:1 (e.g., the interior diameters of the heating/cooling transfer tube 63 and annular space 61 being 6 inches and one inch, respectively).

Without wishing to be limited by theory, the shear in the scraped-surface heat exchanger 60 advantageously contributes to both the nucleation of fat crystals and rate of crystal growth. In one aspect, the crème filling is generally highly viscous with a low thermal diffusivity and cooling the wall of the heating/cooling transfer tube 63 without agitation is likely to result in large temperature gradients. Nucleation sites may be generated as the molten fat cools and changes phase. Agitation by the scraper blades 67 may maximize the crème that can interact with the cold wall of the cooling transfer tube 63 and form nucleation sites. Without wishing to be limited by theory, the mixing caused by the action of the scraper blades 67 provides even distribution of nucleation sites within the material and may increase the rate of crystallization. Without wishing to be limited by theory, increasing the mixing and shear rate may also generate more cooling and desired uniformity of nucleation sites. In one aspect, nucleation permits sugar molecules to stick together and form large crystal structures. More specifically, the shear in the scraped-surface heat exchanger 60 assists in controlling the network of the crystals such that higher shear typically results in smaller crystals and less viscous matter and a more structured network via aggregation.

Without wishing to be limited by theory, the cooling rate of the slurry in the scraped-surface heat exchanger 60 and the shear provided by the scraped-surface heat exchanger 60 advantageously provides for formation of ß' (beta prime) fat crystals in the slurry. For example, rapid cooling may result in the creation of unstable α fat crystals, while the cooling rates according to the method discussed herein result in the formation of the ß' crystals. In one approach, the relative amounts of α, ß, and ß' crystals may be determined by X-ray diffraction. Generally, it is desirable for the filling to include a majority of crystals in ß' form, in another aspect at least 90 percent of the crystals are in ß' form, in yet another aspect at least 75 percent of the crystals are in ß' form.

Figure 5:
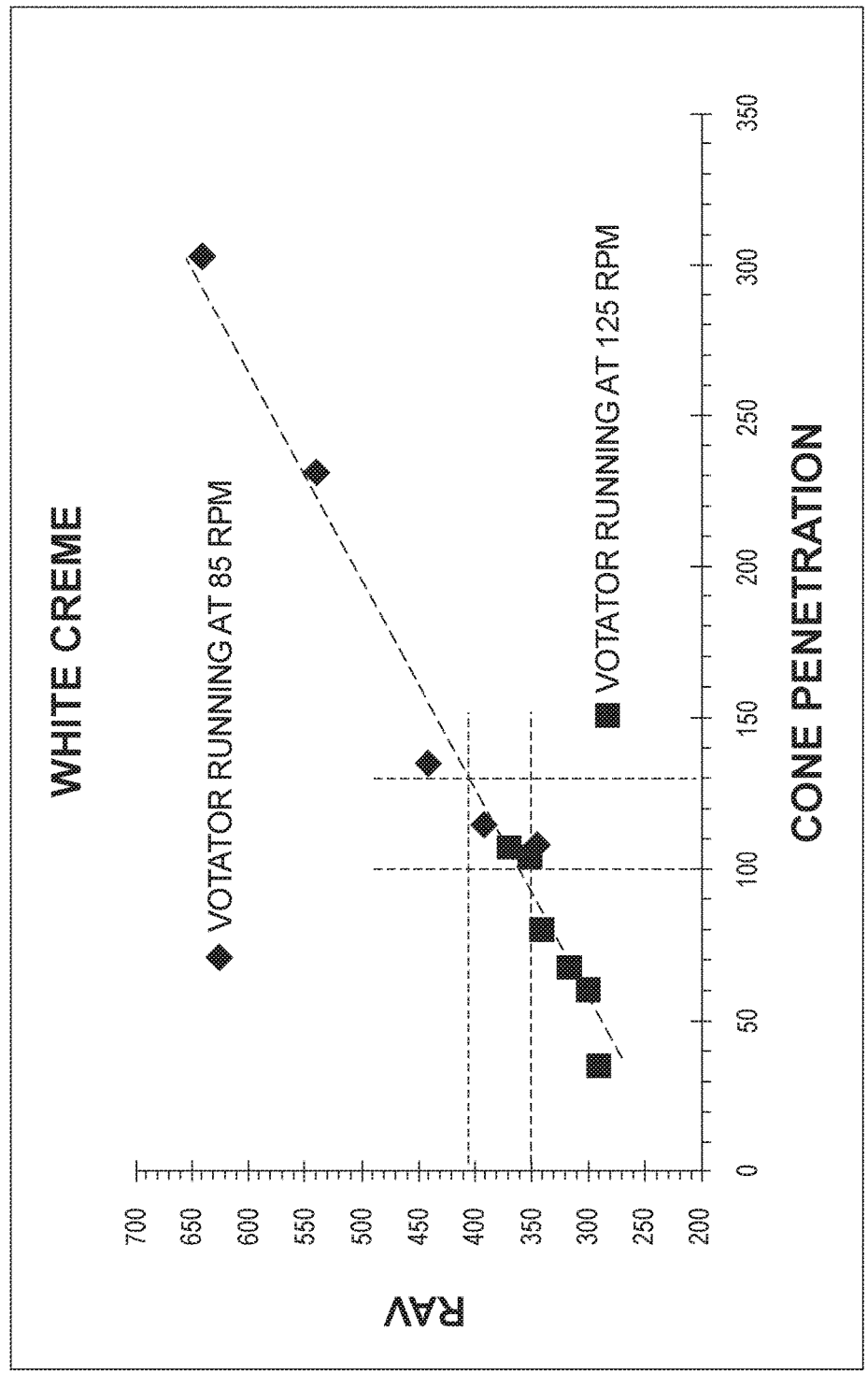
FIG. 5 shows additional exemplary cone penetrometry data obtained during trial runs of a crème filling manufacturing process of FIG. 1 at varying conditions.

The crystal state and rheology of the filling in the scraped-surface heat exchanger 60 may be analyzed, for example, via cone penetration and/or a power meter connected to the scraped-surface heat exchanger 60. A graph comparing cone penetration peak force and power meter calculated viscosity (RAV) is shown in FIG. 5. In one aspect, both the cone penetration and power meter values were used to determine desired operating viscosity values at startup of crème and sandwiching operation. Once a linear relationship between the cone penetration data and the power meter data was validated, RAV may be used for ongoing process control. Generally when the filling includes a majority of crystals in the ß' form, the viscosity of the slurry is higher than when the crystals are in the α form.

In one aspect, as the slurry moves through the interior volume of the scraped-surface heat exchanger 60, a pressure drop in the scraped-surface heat exchanger 60 may be measured. For example, the pressure drop in the scraped-surface heat exchanger 60 may be between about 15 and about 20 psi in one approach, and approximately 17 psi in another approach. In one aspect, pressure is measured at the infeed of the scraped-surface heat exchanger 60 as well as at the infeed of the rotary sandwiching machine. Further, pressure may be controlled at the infeed of the rotary sandwiching machine to control the crème extrusion rate and deposit weight. In one aspect, pressure at the infeed of the scraped-surface heat exchanger 60 and corresponding pressure drop provide an indication of the operating viscosity of the slurry which is controlled through formulation and process conditions.

With reference to FIG. 1, a crème filling having a desired degree of crystallization exits the scraped-surface heat exchanger 60 via a conduit 65 (e.g., a nozzle and/or a pipe). For example, at least in some approaches, the crème filling may exit the scraped-surface heat exchanger 60 at an outlet temperature of between about 60° F. to about 90° F. in one aspect, in another aspect at a temperature of about 60° F. to about 80° F., in another aspect about 60° F. to about 70° F., and in another aspect at a temperature of about 63° F. to about 67° F. The temperature of the filling at outlet from the heat exchanger 60 may depend, at least in part, on the types and relative amounts of the ingredients of the filling. Therefore, the outlet temperature of the filling may be adjusted to account for the ingredients and to provide a desired relative crystalline content of the resulting filling.

Figure 6:
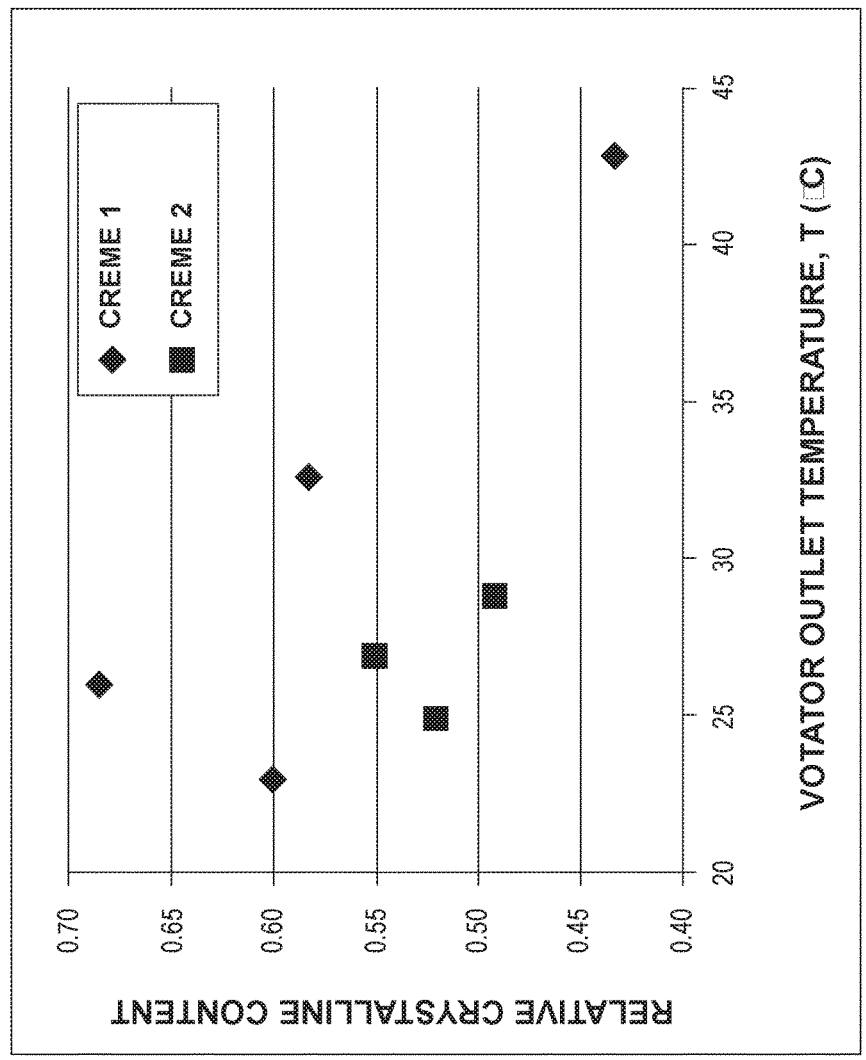
FIG. 6 shows a graph with exemplary data points indicating the relationship between the outlet temperature of the scraped-surface heat exchanger and the relative crystalline content of the resulting crème filling.
Figure 7:
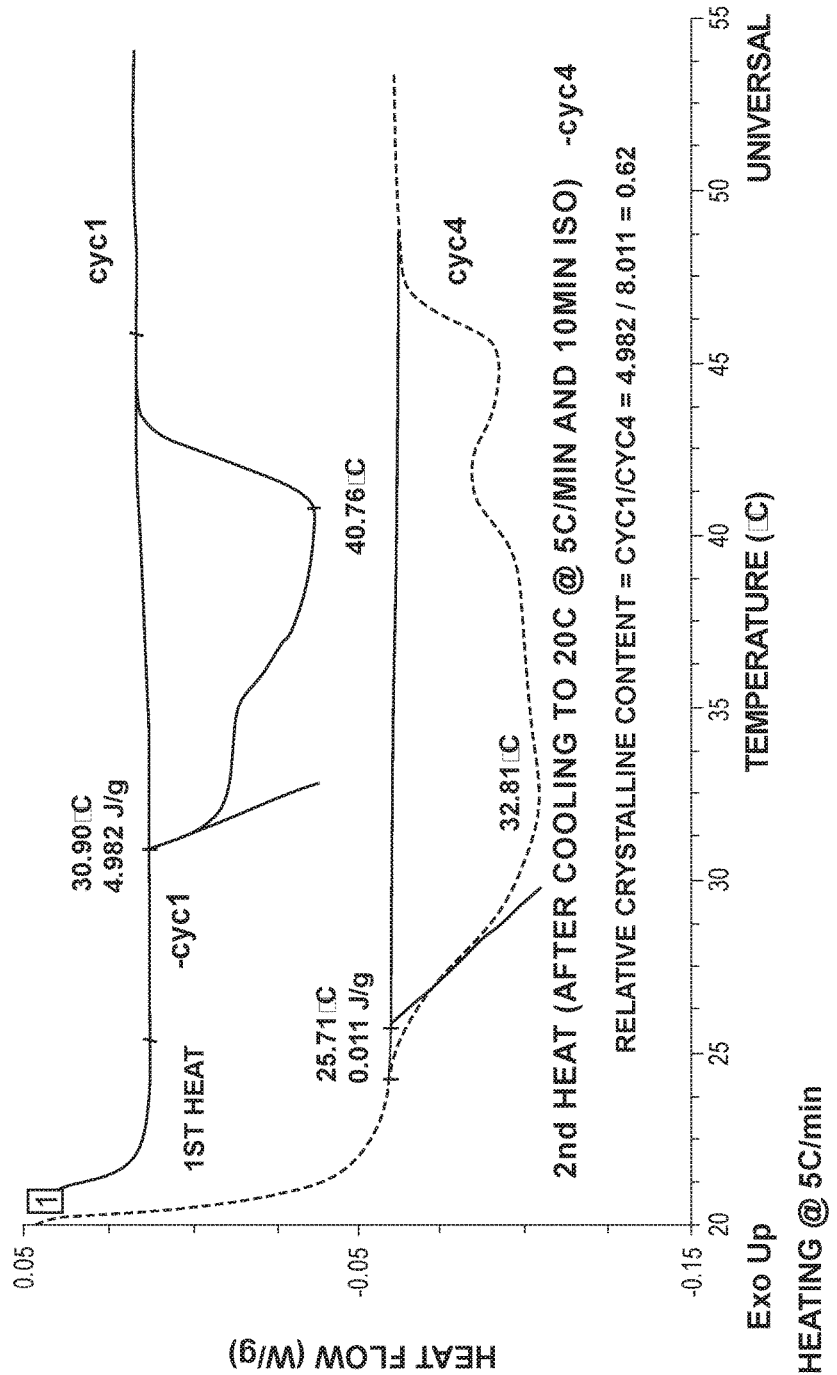
FIG. 7 shows a graph illustrating a sample data set generated during a determination of the relative crystalline content of a sample batch of crème filling.

As illustrated in FIG. 6, the outlet temperature of the filling exiting the scraped-surface heat exchanger 60 is believed to affect the relative crystalline content of the filling. The measurements of the relative crystalline content were generated using DSC (differential scanning calorimetry), which may quantitatively determine the heat required to melt all of the crystalline material present in the filling and permits for normalization for variable sugar content in a sample being analyzed. In one aspect, a method of determining the relative crystalline content of the crème exiting the scraped-surface heat exchanger 60 may include a first heating step (cycle 1) that quantifies the heat required (enthalpy, $\Delta H$) to melt all crystalline material found in the filling. In one approach, the first heating step heats the filling at 5° C. per minute until the temperature reaches the melting temperature of the fat component plus 5° C. Since the sugar to fat ratio in the filling may lead to sample inhomogeneity (and therefore wrong enthalpy) in the first heating step (cycle 1), the sugar to fat ratio is therefore normalized via a second heating step (cycle 2) against the heat required (enthalpy, $\Delta H$) to melt all crystalline material artificially created in the filling upon fully melting the crème and then holding isothermal at 20° C. (68° F.) for 10 minutes. In one approach, after the second heating step, the filling is then cooled at 5° C. per minute until the temperature reaches 20° C. Without wishing to be limited by theory, while the $\Delta H_{cycle1}$ can depend on filling processing and/or handling and the sugar to fat ratio, the $\Delta H_{cycle2}$ can only depend on the sugar:fat ratio. As such, the relative crystalline content by DSC may be determined via determining a quotient of the $\Delta H_{cycle1}/\Delta H_{cycle2}$. In other words, the relative crystalline content by DSC=$\Delta$Hcycle1/$\Delta$Hcycle2. A sample data set generated in one exemplary method of determining the relative crystalline content of a sample batch of crème is illustrated in FIG. 7 (as determined by $\Delta$Hcycle1/$\Delta$Hcycle4).

As can be seen in Table 2 below, the outlet temperature of the scraped-surface heat exchanger 60 affects the relative crystalline content of the filling that exits from the scraped-surface heat exchanger 60 and flows to the rotary sandwiching machine. The data is also presented in FIG. 7.

TABLE 2

Relationship of the Outlet Temperature of the Scraped-Surface Heat Exchanger and Relative Crystalline Content of the Filling

|  | Temp Outlet (° C.) | ΔH meltingCyc1 | ΔH meltingCyc4 | Relative crystalline content (Cyc1/Cyc4) |
|---|---|---|---|---|
| Cream 1 | 42.8 | −3.128 | −7.217 | 0.43 |
|  | 32.6 | −3.943 | −6.773 | 0.58 |
|  | 26 | −4.872 | −7.121 | 0.68 |
|  | 23 | −4.366 | −7.275 | 0.60 |
| Cream 2 | 27.0 | 6.7 | 12.1 | 0.55 |
|  | 28.9 | 5.8 | 11.7 | 0.49 |
|  | 25 | 6.3 | 12.0 | 0.52 |

In the form illustrated in FIG. 1, the crème filling exiting the scraped-surface heat exchanger 60 flows in conduit 65 to a rotary sandwiching machine 70, where sandwich-type cookies (such as OREO® cookies) may be made. In one aspect, the temperature of conduit 65 is controlled to preserve the desired crystallinity of the filling and the rotary sandwiching machine 70 may include heaters to restrict the filling from prematurely crystallizing. In one approach, jacketed piping may be positioned between the scraped-surface heat exchanger 60 and a rotary sandwich machine infeed. The pipe jackets may be heated with hot water that may also run through heaters inside a filling deposit head in the rotary sandwich machine. In one approach, the temperature of the walls of the jacketed pipes is set higher than or higher than the maximum preferred scraped heat exchanger discharge temperature (e.g., higher than about 86° F. (30° C.)) to ensure that the filling does not solidify and build up on the walls of the pipe. In one aspect, a heater may be used in the deposit head to melt the filling during production breaks and to prevent or reduce solidification of the filling in the deposit head.

In an optional approach and as shown in FIG. 1, a recycle conduit 75 such as a pipe branches from the conduit 65 and returns a portion of the filling exiting the scraped-surface heat exchanger 60 back to the crème holding tank 50. Since, as mentioned above, the filling exits the scraped-surface heat exchanger 60 via the conduit 65 at an outlet temperature below the melting point of the fat component and the slurry in the filling holding tank 50 is stored at a temperature in excess of the melting point of the fat component, a hot water jacket may be provided around the recycle conduit 75 to heat the filling being recycled back toward the filling holding tank 50 so that filling is at a temperature above the melting point of the fat component as it re-enters the crème holding tank 50 via the recycle conduit 75.

In one aspect, as the recycle pipe 75 comes back to the crime holding tank 50, there is a pressure drop in the recycle pipe 75. Depending on the diameter of the recycle pipe 75, the pressure loss per meter may be approximately as follows: about 7.5 bar/m for a 25 mm diameter recycle pipe 75; approximately 2.5 bar/m for 50 mm diameter recycle pipe 75; approximately 1 bar/m for 75 mm diameter recycle pipe 75; approximately 0.5 bar/m for 100 mm diameter recycle pipe 75; and approximately 0.25 bar/m for 150 mm diameter recycle pipe 75. In one aspect, as the crystallized crème filling is recycled, the temperature increases due to heat transfer with the hot jacketed wall temperatures and through shear in static mixers. In one aspect, the temperature of the filling is above the melting point of the fat in order to erase the crystal memory and return the filling to a slurried form.

The pressure drop is an indication of the heating rate in the recycle as viscosity decreases with increasing temperature and shear.

Advantages and embodiments of the methods and compositions produced by the methods described herein are further illustrated by the following examples; however, the particular conditions, processing schemes, materials, and amounts thereof recited in these examples, as well as other conditions and details, should not be construed to unduly limit this method. All percentages recited herein are by weight unless specified otherwise.

The following example illustrates the production of a crème filling according to one form of the methods described herein.

Example

Three fillings were prepared according to the formulations shown in Table 3 below.

TABLE 3

Exemplary Ingredients of Original, Chocolate, and Strawberry Fillings

| Ingredient | Original | Chocolate | Strawberry |
|---|---|---|---|
| Vegetable Shortening | 34.70% | 34.537% | 30.97% |
| Powdered sugar | 65.23% | 62.589% | 67.31% |
| Soy Lecithin | 0.02% | 0.023% | 0.19% |
| Flavor | 0.05% | 0.054% | — |
| Cocoa | — | 2.798% | — |

The shortening (having a melting point of about 115° F.) was heated to a temperature of at least 25° F. above the melting point of the shortening and combined with the remaining ingredients to form a slurry. The slurry was passed through a scraped-surface heat exchanger 60 (Votator, such as a Votator 6×72-II-XHD: 6" diameter oval cylinder×72" cylinder length; 4" shaft (variable annular space); volume of 1.365 ft$^3$=6 gallons; pressure rating for XHD=56 bar=800 psi; motor size can be 20, 25, or 30 hp; spline 17-4 PH stainless steel (2"=50 mm); heat transfer surface area of 6×72=9 ft$^2$) at through put rates, shaft speeds, and jacket temperatures shown in Table 4 below.

TABLE 4

Variables Relating to the Scraped-Surface Heat Exchanger

| Factor Name | Units | Low | Middle | High |
|---|---|---|---|---|
| Slurry Thru put | kg/hr | 500 | 750 | 1000 |
| Votator Shaft Speed | RPM | 80 | 100 | 120 |
| Votator Jacket Temp | ° C. | 4 | 8 | 12 |

The properties of the filling were measured using a cone penetration technique. Specifically, the specific gravity of the filling was measured with a cylinder with perforated lid to ensure the complete filling of the measure volume. Cone penetration was measured at 1 minute, 3 minutes, 4 minutes, 5 minutes, and 10 minutes after the filling exited the scraped-surface heat exchanger 60 to evaluate the rheology of the slurry over time. The results are shown in FIG. 3.

Figure 4:
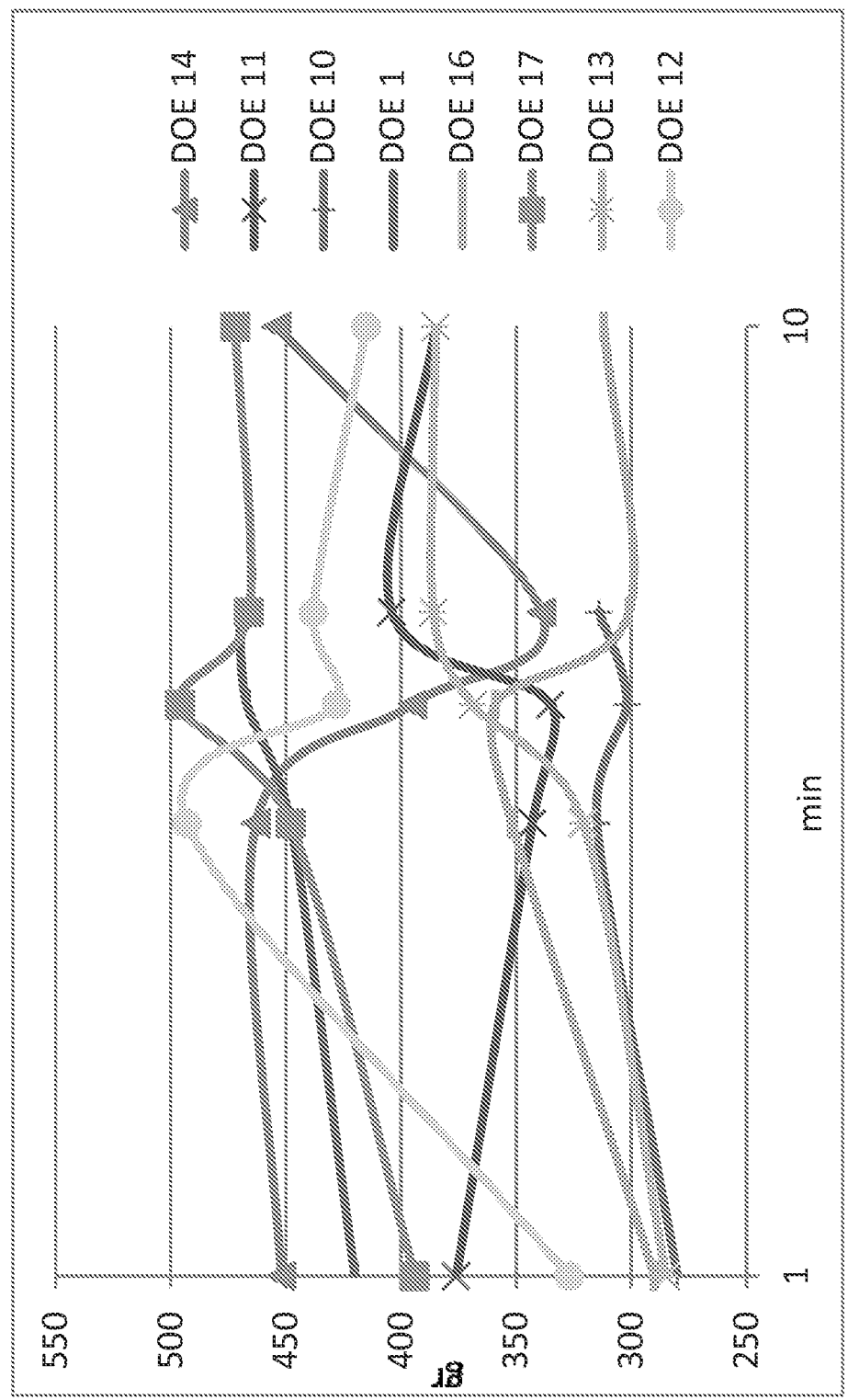
FIG. 4 shows additional exemplary cone penetrometry data obtained during trial runs of a crème filling manufacturing process of FIG. 1 at varying conditions.

Cone penetrometry data were obtained during multiple runs of the present process at varying slurry feed rates, rotor speeds of the scraped-surface heat exchanger 60, and temperatures of the cooling liquid in the cooling jacket of the scraped-surface heat exchanger, taken at 1, 3, 4, 5, and 10 minutes. The results are shown in FIG. 4 and Table 5 below.

For the formulations of Table 3, it was determined that a target average cone penetrometry value of about 360 g represents a filling with optimal crystallinity.

TABLE 5

Cone Penetrometry Values

| Sample | Slurry Temp (° C.) | Slurry Feed Rate (kg/h) | Slurry Pump Speed (RPM) | Slurry Pump Pressure (Bar) | RPM Votator SSHE | Filling Specific Gravity | Cream Temp In (° C.) | Cream Temp Out (° C.) | Chilled Water T Set Point (° C.) |
|---|---|---|---|---|---|---|---|---|---|
| DOE 1 | | 500 | 65 | 4.2 | 80 | 1.05 | 46.4 | 24.7 | 12 |
| DOE 2 | | 500 | 65 | 2.9 | 120 | 1.04 | 46.4 | 25.7 | 12 |
| DOE 3A | | 1000 | 133 | 1.8 | 164 | 0.98 | 46.4 | 28.9 | 12 |
| DOE 3 | | 1000 | 133 | 1.8 | 80 | 0.99 | 46.4 | 27 | 12 |
| DOE 4 | | 1000 | 133 | 3.7 | 120 | 0.92 | 45.9 | 28.1 | 12 |
| DOE 5 | | 750 | 99 | 3.4 | 100 | 0.93 | 44.7 | 23.5 | 8 |
| DOE 6 | | 500 | 65 | 6.4 | 80 | 1.09 | 48 | 19.4 | 4 |
| DOE 7 | | 1000 | 133 | 4.9 | 80 | 1.01 | 46.3 | 23.6 | 4 |
| DOE 8 | | 1000 | 133 | 6.6 | 80 | 1 | 48 | 25 | 4 |
| DOE 9 | | 500 | 65 | 6.9 | 80 | 0.97 | 47.4 | 21.1 | 4 |
| DOE 10 | 48.9 | 750 | 99 | 4.7 | 100 | 1.04 | 48.9 | 27.7 | 4 |
| DOE 11 | 47.3 | 750 | 99 | 4.7 | 80 | 1.05 | 47.3 | 26.5 | 8 |
| DOE 12 | 47.4 | 750 | 99 | 4.8 | 100 | 1.05 | 47.4 | 26.1 | 8 |
| DOE 13 | 47.4 | 750 | 99 | 5.2 | 120 | 1.04 | 47.4 | 25.9 | 8 |
| DOE 14 | 47.1 | 750 | 99 | 4.6 | 100 | 1.02 | 47.1 | 25.8 | 8 |
| DOE 15 | 48.2 | 1000 | 133 | 2.1 | 120 | 1.06 | 48.2 | 32.4 | 8 |
| DOE 16 | 48.6 | 500 | 65 | 5.1 | 100 | 1.02 | 48.6 | 28.3 | 8 |
| DOE 17 | 48.4 | 750 | 99 | 4.4 | 100 | 1.03 | 48.4 | 26.9 | 12 |
| DOE 18 | 48.4 | 750 | 99 | 5.2 | 100 | 1.09 | 48.4 | 26.3 | 8 |

| Sample | Cone Penetrom 0 (1 min) | Cone Penetrom 1 (3 min) | Cone Penetrom 2 (4 min) | Cone Penetrom. 3 (5 min) | Cone Penetrom. 4 (10 min) | Average Cone Penetrometry Between 3-5 Min | Variation from 3 to 5 Min | Value Change from 1 to 3-5 Min |
|---|---|---|---|---|---|---|---|---|
| DOE 1 | 420 | 448 | 467 | 470 | — | 462 | 5% | 9% |
| DOE 2 | 107 | 312 | 347 | 332 | — | 330 | 11% | 68% |
| DOE 3A | 453 | 760 | 760 | 563 | — | 694 | 28% | 35% |
| DOE 3 | 382 | 622 | 664 | 568 | — | 618 | 16% | 38% |
| DOE 4 | 478 | 649 | 680 | 622 | — | 650 | 9% | 26% |
| DOE 5 | 741 | 946 | 637 | 936 | — | 840 | 37% | 12% |
| DOE 6 | 1937 | 1311.8 | 1079 | 1450 | — | 1280 | 29% | −51% |
| DOE 7 | 1103 | 1219 | 1258 | 1338 | — | 1272 | 9% | 13% |
| DOE 8 | 919 | 1776 | 1805 | 1705 | — | 1762 | 6% | 48% |
| DOE 9 | 1792 | 1723 | 1500 | 1647 | — | 1623 | 14% | −10% |
| DOE 10 | 280 | 315 | 302 | 314 | — | 303 | 4% | 8% |
| DOE 11 | 376 | 343 | 335 | 404 | 385 | 365 | 19% | −3% |
| DOE 12 | 327 | 493 | 428 | 438 | 415 | 422 | 15% | 22% |
| DOE 13 | 285 | 321 | 369 | 386 | 385 | 340 | 19% | 16% |
| DOE 14 | 452 | 463 | 395 | 339 | 454 | 412 | 30% | −10% |
| DOE 15 | 790 | 1006 | 972 | 941 | 860 | 927 | 7% | 15% |
| DOE 16 | 290 | 352 | 359 | 301 | 312 | 326 | 18% | 11% |
| DOE 17 | 394 | 448 | 496 | 466 | 472 | 451 | 11% | 13% |
| DOE 18 | 1112 | 1122 | 979 | 1125 | 1150 | 1085 | 13% | −3% |

As can be seen in Table 5 above and FIG. 4, the target rheology and stability value was met at slurry feed rates of 500 and 750 kg/hr, albeit at different settings. The specific gravity of the filling was found to be most stable at the center of the operating speed for the votator (75-90 RPMs). The average cone penetrometry values were measured from 3 to 5 minutes (in FIG. 4), while the last column indicates a percentage change of the average cone penetrometry value at 3-5 minutes relative to the cone penetrometry value measured at 1 minute (in FIG. 4). The results in Table 5 indicate that the RPM of the rotor of the scraped-surface heat exchanger 60 and the temperature of the cooling liquid in the cooling jacket of the scraped-surface heat exchanger 60 can be adjusted for each slurry feed rate to achieve a target rheological value (exhibited in Table 5 by the average cone penetrometry data) for the filling. For example, average cone penetrometry values closest to the predetermined target average penetrometry value of 360 were obtained with a slurry feed rate of between 500 kg/hr and 750 kg/hr, with the scraped-surface heat exchanger 60 being set between 80 and 120 rotations per minute, and the temperature of the cooling liquid being set between 4° C. and 12° C., more preferably, between 4° C. and 8° C.

The method and system disclosed herein advantageously provides a filling having rheological properties that match and/or exceed that of fillings prepared using a cooling tunnel at a downstream end of the manufacturing line. In addition, the present method and system achieves a stable filling with desired rheological, crystallinity and mouthfeel properties while eliminating the cooling tunnel from the production line, which cuts down costs as well as manufacturing time.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method of making a filling, the method comprising:
   heating a fat component to a temperature of 10° F. to 25° F. above a melting point of the fat component;
   combining the fat component with a sugar source and continuously mixing the fat component and the sugar source while maintaining the temperature of 10° F. to 25° F. above the melting point of the fat component to form a slurry;
   introducing the slurry at the temperature of 10° F. to 25° F. above the melting point of the fat component into a scraped-surface heat exchanger;
   cooling the slurry in the scraped surface heat exchanger at a cooling rate of about 7° F./minute to about 72° F./minute; and
   dispensing the slurry from the heat exchanger at a temperature effective to provide the filling.

2. The method of claim 1, wherein the fat component is selected from canola oil, palm oil, high oleic canola oil, soybean oil, safflower oil, sunflower oil, palm kernel oil, shea butter, mango kernel oil, illipe oil, sal oil, cocoa butter, equivalents of cocoa butter, or combinations thereof.

3. The method of claim 1, wherein the sugar source has a $D_{90}$ of from about 40 µm to about 180 µm.

4. The method of claim 1, wherein the sugar source has a $D_{90}$ of from about 40 µm to about 80 µm.

5. The method of claim 1, wherein the cooling of the slurry in the scraped-surface heat exchanger further includes moving the slurry through the scraped-surface heat exchanger at a through-put rate of between 500 kg/hr to about 1000 kg/hr.

6. The method of claim 1, wherein the cooling of the slurry in the scraped-surface heat exchanger further includes moving the slurry through the scraped-surface heat exchanger at a through-put rate of between 500 kg/hr to about 750 kg/hr.

7. The method of claim 1, wherein the cooling of the slurry in the scraped-surface heat exchanger further includes rotating a rotor of the scraped-surface heat exchanger at a speed of about 80 rotations per minute to about 120 rotations per minute.

8. The method of claim 1, wherein the slurry passes through an annular space of the scraped-surface heat exchanger located between an outside diameter of a rotor of the scraped-surface heat exchanger and an interior diameter of a cooling transfer tube of the scraped surface heat exchanger, wherein the cooling the slurry in the scraped-surface heat exchanger includes rotating the rotor of the scraped-surface heat exchanger, and wherein a ratio of the interior diameter of the cooling transfer tube of the scraped-surface heat exchanger to the annular space of the scraped-surface heat exchanger is about 6 to 1.

9. The method of claim 1, wherein the cooling of the slurry in the scraped-surface heat exchanger includes moving the slurry through the scraped-surface heat exchanger such that the residence time of the slurry in the heat exchanger is from about 1 to about 14 minutes.

10. The method of claim 1, wherein the cooling of the slurry in the scraped-surface heat exchanger includes moving the slurry through the scraped-surface heat exchanger such that the residence time of the slurry in the heat exchanger is from about 2 to about 6 minutes.

11. The method of claim 1, wherein the dispensing of the slurry from the heat exchanger at a temperature effective to provide the filling further includes dispensing the slurry from the heat exchanger at a temperature of about 60° F. to about 90° F.

12. The method of claim 1, wherein the dispensing of the slurry from the heat exchanger at a temperature effective to provide the filling further includes dispensing the slurry from the heat exchanger at a temperature of about 63° F. to about 67° F.

13. The method of claim 1, wherein the dispensing of the slurry from the heat exchanger at a temperature effective to provide the filling further includes dispensing the slurry from the heat exchanger at a temperature about 35° to about 50° F. below the melting point of the fat component.

14. The method of claim 1, wherein the slurry includes about 20 to about 50 percent fat component.

15. The method of claim 1, wherein the slurry includes about 50 to about 80 percent sugar.

16. The method of claim 1, wherein the slurry includes about 25 to about 45 percent fat component.

17. The method of claim 1, wherein the slurry includes about 55 to about 75 percent sugar.

* * * * *